United States Patent
Schoebel-Theuer

(10) Patent No.: US 9,910,592 B2
(45) Date of Patent: Mar. 6, 2018

(54) SYSTEM AND METHOD FOR REPLICATING DATA STORED ON NON-VOLATILE STORAGE MEDIA USING A VOLATILE MEMORY AS A MEMORY BUFFER

(71) Applicant: 1&1 Internet AG, Karlsruhe (DE)

(72) Inventor: Thomas Schoebel-Theuer, Karlsruhe (DE)

(73) Assignee: 1&1 Internet SE, Montabaur (DE)

( * ) Notice: Subject to any disclaimer, the term of this patent is extended or adjusted under 35 U.S.C. 154(b) by 0 days.

(21) Appl. No.: 14/763,942

(22) PCT Filed: Jan. 28, 2014

(86) PCT No.: PCT/EP2014/051664
§ 371 (c)(1),
(2) Date: Jul. 28, 2015

(87) PCT Pub. No.: WO2014/114817
PCT Pub. Date: Jul. 31, 2014

(65) Prior Publication Data
US 2015/0370483 A1    Dec. 24, 2015

(30) Foreign Application Priority Data

Jan. 28, 2013 (GB) .................... 1301498.0

(51) Int. Cl.
G06F 12/00 (2006.01)
G06F 3/06 (2006.01)
G06F 11/20 (2006.01)

(52) U.S. Cl.
CPC ............ *G06F 3/0604* (2013.01); *G06F 3/065* (2013.01); *G06F 3/0683* (2013.01); *G06F 11/2074* (2013.01); *G06F 2201/855* (2013.01)

(58) Field of Classification Search
CPC ...... G06F 3/0604; G06F 3/065; G06F 3/0683; G06F 11/2074; G06F 2201/855
See application file for complete search history.

(56) References Cited

U.S. PATENT DOCUMENTS

| | | | |
|---|---|---|---|
| 6,321,234 | B1 | 11/2001 | DeBrunner |
| 2004/0098425 | A1 | 5/2004 | Wiss et al. |
| 2006/0179343 | A1 | 8/2006 | Kitamura |
| 2007/0162516 | A1 | 7/2007 | Thiel et al. |

(Continued)

*Primary Examiner* — John A Lane
(74) *Attorney, Agent, or Firm* — Leydig, Voit & Mayer, Ltd.

(57) ABSTRACT

A system for replicating data comprising includes a first and a second computing device. The first computing device has a first storage unit configured to store block level data, a second storage unit and a volatile memory. The second computing device has a third storage unit and a fourth storage unit configured to store block level data, the third storage unit being communicatively coupled to the second storage unit. The first computing device is configured to receive write requests each containing payload data, write the payload data of the write requests to the volatile memory and append the payload data to the second storage unit, and acknowledge the write requests prior to writing the respective payload data to the second storage unit. The second computing device is configured to detect new data in the third storage unit and apply the new data to the fourth storage unit.

13 Claims, 5 Drawing Sheets

(56) References Cited

U.S. PATENT DOCUMENTS

| | | |
|---|---|---|
| 2007/0185938 A1 | 8/2007 | Prahlad et al. |
| 2008/0086609 A1* | 4/2008 | Lesser .................. G06F 11/1458 |
| | | 711/162 |
| 2013/0024722 A1 | 1/2013 | Kotagiri et al. |

* cited by examiner

SYSTEM AND METHOD FOR REPLICATING DATA STORED ON NON-VOLATILE STORAGE MEDIA USING A VOLATILE MEMORY AS A MEMORY BUFFER

CROSS-REFERENCE TO PRIOR APPLICATIONS

This application is a U.S. National Phase Application under 35 U.S.C. §371 of International Application No. PCT/EP/2014/051664, filed on Jan. 28, 2014, and claims benefit to British Patent Application No. GB 1301498.0, filed on Jan. 28, 2013. The International Application was published in English on Jul. 31, 2014 as WO 2014/114817 under PCT Article 21(2).

FIELD

The present invention relates to a system and a method for replicating data, in particular to data stored on non-volatile storage media.

BACKGROUND

Every storage media is subjected to eventual temporal or permanent failure—With removable media there is a risk of loss or misplacement, typically stationary media such as hard disks are subject to wear and tear over time. Typically users try to mitigate the risk of losing data by periodically copying the data from one storage medium to another. Ideally both media are not subject to the same risk, i.e. they are kept at separate places to ensure that they are not impacted by the same event such as fire, flooding etc. Computer systems and software for computer systems aid the user in keeping backups of his data, e.g. by means of an archiving or backup software that periodically either reminds the user to backup his data on a separate medium or performs such a backup automatically based on preset parameters. In case of a failure of the primary media the user either replaces the primary medium with one of the backup media, i.e. the selected backup medium becomes the new primary medium. As an alternative, a new empty primary media is supplied and the data is copied or restored from one of the backup media.

In case not only data integrity but also data availability matters, there are techniques known such as RAID systems, that continually mirror data from one storage medium to at least one other. E.g. RAID-1 defines implements such a mirror process which ensures that upon failure of the primary medium the data can be retrieved from a synchronized copy on a second medium without interruption of the service.

For professional services, high availability clusters are known utilizing for example Distributed Replicated Block Devices (DRBD) for a distributed storage system. DRBD essentially defines RAID-1 type capabilities over a network, thus provides for spatial redundant storage. In more detail, DRBD provides for logical block devices acting as a proxy for the physical local block devices in each storage node. Data written to the logical block device on the primary node is transferred to a physical block device in the primary node and subsequently copied to the secondary node. In case of a storage media failure at the primary node, the secondary node is promoted to become the new primary node. However, this transition results in inconsistencies between the data stored in the primary and secondary not and thus requires a subsequent verification of the integrity of the file system stacked on top of DRBD or the deployment of a journaling file system such as EXT4.

Generally, systems deploying DRBD require a network connection between each storage systems hat exhibits high and constant data throughput typically only found in managed local area networks. DRBD operates synchronously and fails to perform well in wide area networks with varying data throughput. In particular if the network bandwidth temporarily drops below the bandwidth required for a synchronous replication, an application running on to of DRBD will see increasingly higher Input/Output latencies and/or hangs or stalls.

SUMMARY

In an embodiment, the present invention provides a system for replicating data including a first computing device and a second computing device. The first computing device has a first storage unit configured to store block level data, a second storage unit and a volatile memory. The second computing device has a third storage unit and a fourth storage unit configured to store block level data, the third storage unit being communicatively coupled to the second storage unit. The first computing device is configured to receive write requests, each of the requests containing payload data; write the payload data of each of the write requests to the volatile memory and append each of the payload data to the second storage unit; and acknowledge the write requests prior to writing the respective payload data to the second storage unit. The second computing device is configured to detect new data in the third storage unit and apply the new data to the fourth storage unit.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a system and a method for replicating data that is tolerant to unreliable network links and that provides anytime data consistency.

An embodiment of the present invention is related to a system for replicating data comprising a first computing device having a first storage unit, a second storage unit and volatile memory. The inventive system further comprises a second computing device having a third and a fourth storage unit, said third storage unit being communicatively coupled to the second storage unit. In a preferred embodiment of the invention the first computing device has means for receiving write requests, each request containing payload data, means for writing said payload data of each write request to the volatile memory and appending said each payload data to the second storage unit, means for acknowledging said write request prior to writing the payload data to the second storage unit. Moreover, the second computing device has means for detecting new data in the third storage unit and means for applying said new data to the fourth storage unit.

According to an embodiment, appending each payload data to the second storage unit includes appending each payload data to the second storage unit in a different order than it was received.

According to an embodiment, appending each payload data to the second storage unit includes appending each payload data to the second storage unit in ascending block number order.

Figure 1:
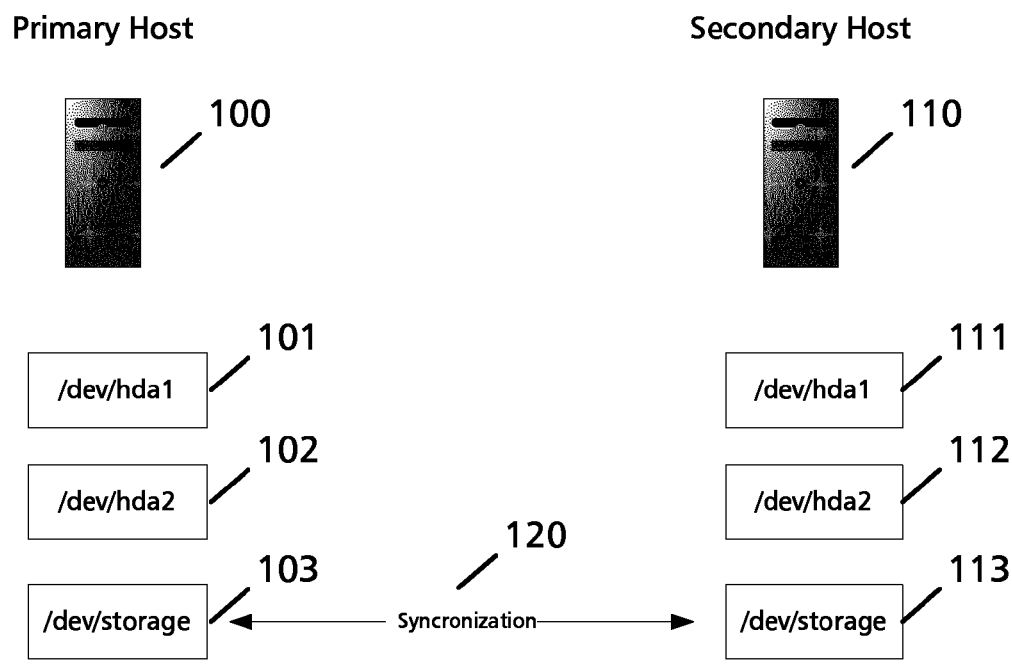
FIG. 1 illustrates a system for replicating data according to prior art. Prior Art systems comprise a primary host (100) having multiple storage units (101, 102) such as block level devices that are exposed as a device file (103) that is exposed for read and write access by applications. In order to provide data redundancy, a secondary host (110) also having multiple storage units (111, 112) mapped to a device file (113) is synchronized (120) with the device file (103) of the primary host.
Figure 2:
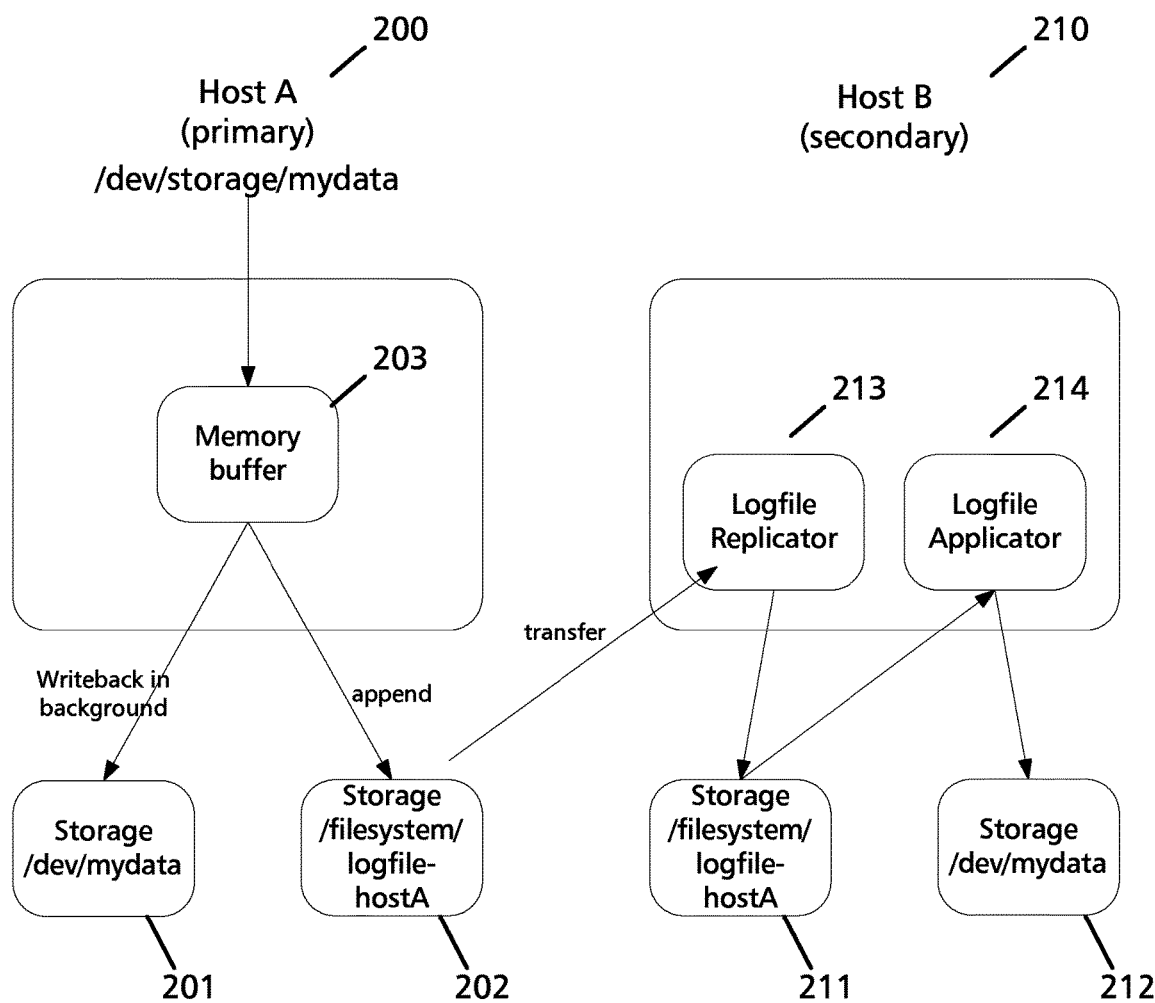
FIG. 2 illustrates a block diagram of an exemplary embodiment of a system for replicating data according to the present invention.

According to an embodiment of the invention, a first computing device (200) and a second computing device (210) are communicatively coupled, each computing device having local physical non-volatile storage (201, 212) that is suited for storing block level data. The physical non-volatile storage, such a single hard disk or a bunch of hard disk logically linked with each other is exposed to the outside using a pseudo device. The pseudo device refers to an arbitrary device node, such as /dev/mydata as shown in FIG. 2.

The first computing device receives one or more write requests (214, 301), each write request may contain meta data such as an op code, a timestamp, a length indication and payload data—said may for example correspond to a full or a portion of a data block to be stored on a block level device.

An inventive concept according to an embodiment includes recording all changes made to a block device (201) in a transaction log file (202). Any write request is treated like a transaction which changes the contents of the block device (201). This is a similar concept to some database systems known in the art, but there exists no separate "commit" operation: any write request is acting like a commit.

Figure 3:
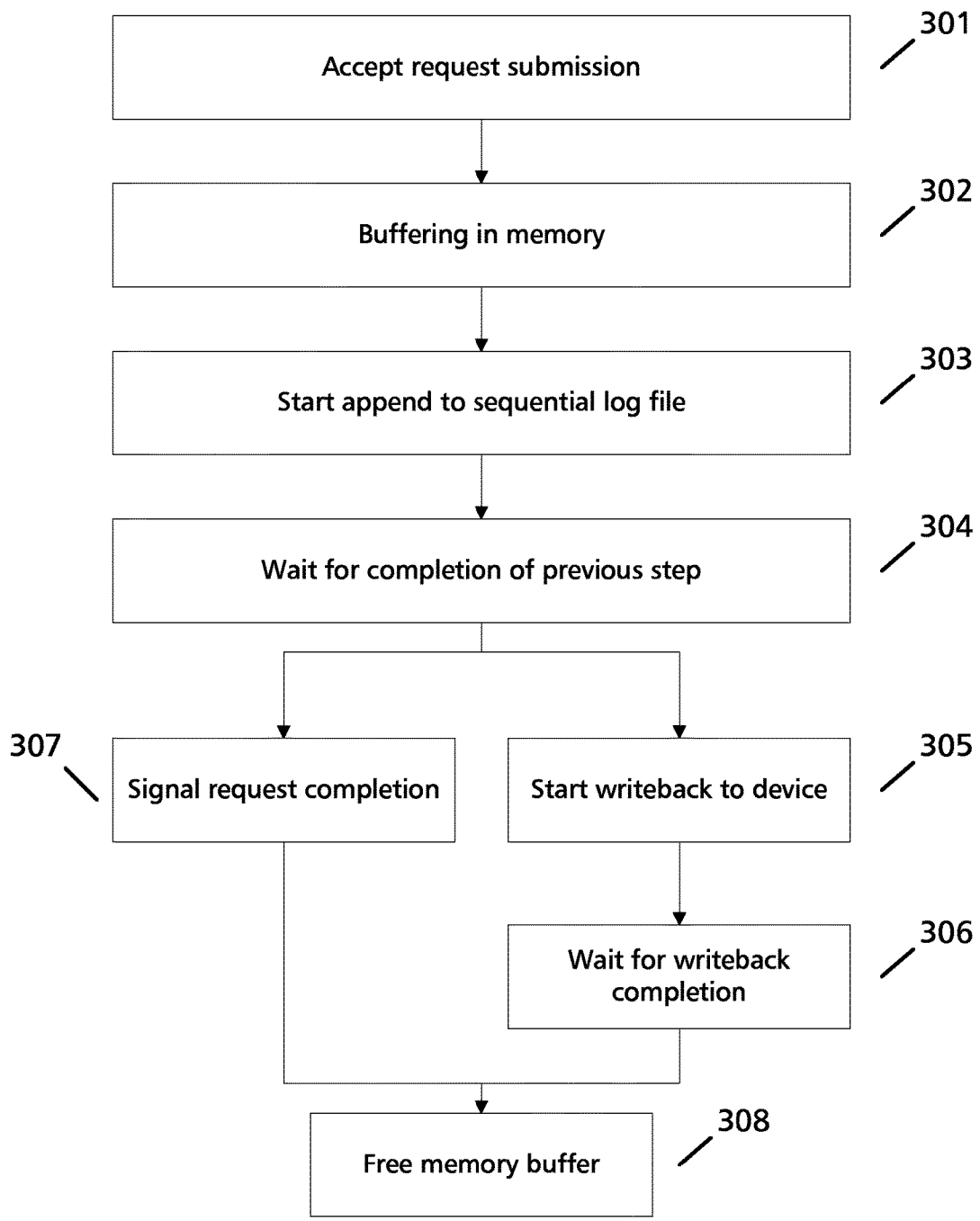
FIG. 3 illustrates a flow chart of an exemplary embodiment for processing data on the primary computing device.

As shown in FIG. 3 the first computing device upon receiving (301) one or more write requests buffers (302) the write requests in a volatile memory such as a RAM acting as a temporary memory buffer (203). This memory buffers serves multiples purposes: It keeps track of the order of write operations. Additionally, it keeps track of the positions in the underlying block level device. In particular, it detects when the same block is overwritten multiple times. Finally, the memory buffers servers the purpose of serving concurrent reads during pending write operations.

After the one or more write request have been buffered, the first computing device starts appending (303) the data to a sequentially organized log file accessible from or attached to the first computing device. This log entry contains vital information such as the logical block number in the underlying block level device, the length of the data, a timestamp, some header magic in order to detect corruption, the log entry number, of course the data itself and optional information like a checksum or compression information. Preferably, the timestamp takes into account the asynchronous communication in a distributed system as described herein. Therefore it is preferred to use a Lamport clock model, in particular the physical Lamport clock model which tries to remain as near as possible to the system clock (i.e. in a Linux-based environment counting in units of seconds since the Unix epoch, with nanosecond resolution. The physical Lamport clock works rather simple: any message send through the network is augmented with a Lamport timestamp telling when the message was sent according to the local Lamport clock of the sender. Whenever that message is received by some receiver, it checks whether the time ordering relation would be violated: whenever the Lamport timestamp in the message would claim that the sender had sent it after it arrived at the receiver (according to drifts in their respective local clocks), something must be wrong. In this case the Lamport clock of the receiver is advanced shortly after the sender Lamport timestamp, such that the time ordering relation is no longer violated. As a consequence, any local Lamport clock may precede the corresponding local system clock. In order to avoid accumulation of deltas between the Lamport and the system clock, the Lamport clock will run slower after that, possibly until it reaches the system clock again, if no other message arrives which sets it forward again. After having reached the system clock, the Lamport clock will continue with "normal" speed.

After the data was successfully appended to the log file, the first computing device promptly signals (307) completion of the received write request(s) to the applications that had issued the requests and starts writing (305) the data to the local storage (201). Even if the system is powered-off at this time, the information is not lost as it is present in the log file and can be reconstructed from there. Notice that the order of log records present in the transaction log defines a total order among the write requests, which is compatible to the partial order of write requests issued on the block level device (201).

Once this write operation has successfully completed (306), the buffer space used in the volatile memory is freed. According to an embodiment of the invention, the first computing device may append the data of the write requests to the log file (202) in different order than it was originally received. In particular, it may order the request in ascending or descending order with respect to the block numbers obtained from the metadata or payload data in each write request. This will reduce the average seek distance of magnetic disks in general. Also, if a write request refers to a block number that has been received previously but not yet completed appending to the log file, the first computing device may process only the last write request for a particular block number and disregard the previous one, for example by freeing the buffer for said previous write request. In case the primary host crashes during writeback, it suffices to replay the log entries from some point in the past until the end of the transaction log file. It does not harm if some log entries are replayed twice or even more often: since the replay is in the original total order, any temporary inconsistency is healed by replaying the log file.

Figure 4:
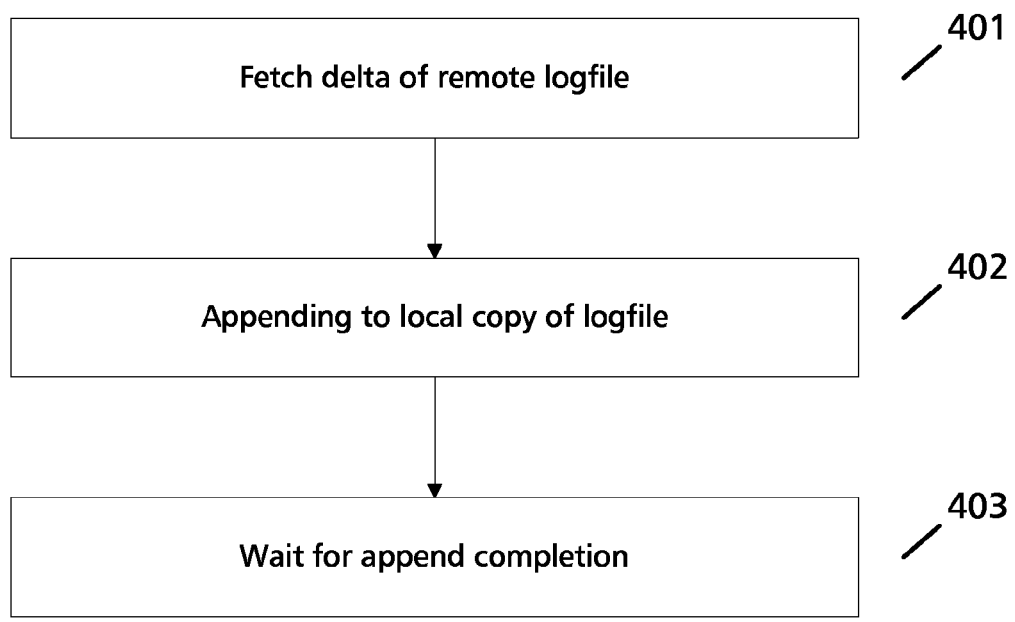
FIGS. 4 and 5 illustrate flow charts of an exemplary embodiment for processing data on the secondary computing device.

According to an embodiment illustrated by FIG. 4, the second computing device detects new data to be written, fetches (401) the delta of the remote log file on the first computing device and appends (402) this data to a local copy of the log file accessible by the second computing device. It should be noted that the step of detecting new data can be performed by several variants:

According to an embodiment of the invention, the second computing devices open a connection oriented network connection (such as a TCP connection) to the first computing device over which either the second computing device pulls for new data from the first computing device or the first computing devices pushes new data to the second computing device through this connection. According to a different embodiment of the invention the two log files (202, 211) may be provided by a shared file system, allowing both the first and the second computing device to access the same file—in this case, appropriate file pointers must be used to determine the respective read/write positions within the file.

According to yet a different embodiment of the invention, the two log files may be synced by an external syncing tool, such as rsync available in the Linux-based computing operating systems.

Figure 5:
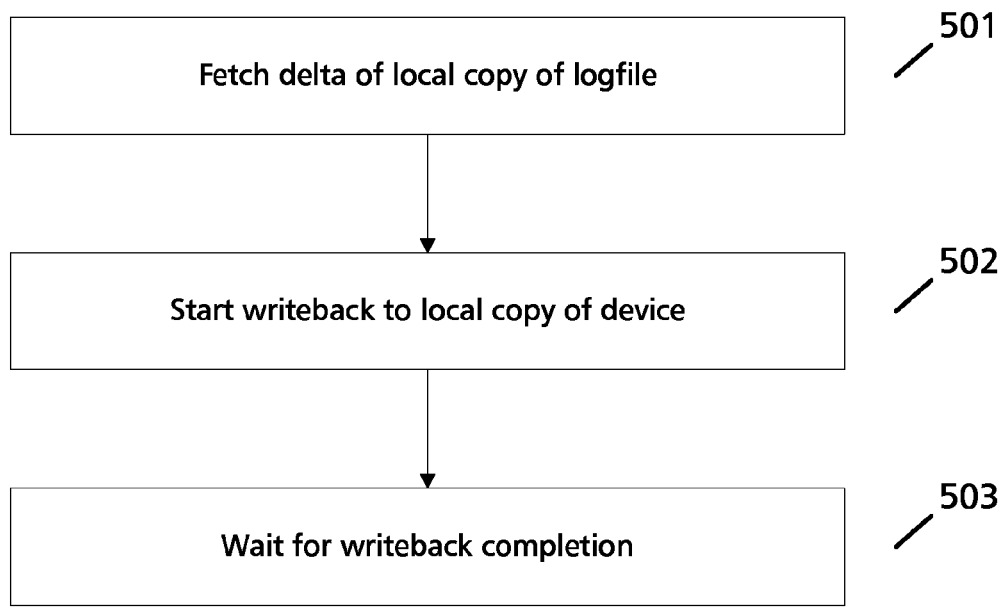

According to an embodiment illustrated by FIG. 5, the second computing devices detects new data to be written, fetches (501) the delta of the local copy of the log file, starts write back (502) to a local non volatile storage.

It should be noted, that each process defined by the process steps in each of FIGS. 3, 4 and 5 may be performed in parallel, for example the first computing device may continue writing the payload of new write requests to the local log file while the second computing device is still busy accessing log file information for the previous requests.

According to an embodiment, there may be more than one secondary computing devices, each having local storage and the ability to perform the steps previously disclosed for the second computing device.

The previous disclosure assumes normal operating conditions, in particular at least a working network connection between the first and second computing device and sufficient memory for storing all necessary data. Embodiments of the present invention shall, however, also cover the following particular cases:

If there is no more space left for writing write requests to the log file (step 303 fails) the first computing devices attempts to free memory by rotating the log file, i.e. moving the log file to a storage with sufficient free space. If this attempt is unsuccessful or provides only temporary relief, the first computing device switches to a "by-pass mode" in which the first computing device refrains from writing to log files and starts writing data directly to the local storage.

If the transfer of the log file from the first computing device to the second computing device results in an incomplete log file at the second computing device, i.e. caused by a faulty network connection, the secondary computing device will attempt a fast full sync based on the last known to be good data in the local log file.

In case of a so-called split-brain condition, i.e. when the checksums of the log files do not match because of a faulty operation at the first computing device, the system requires manual intervention by setting the appropriate computing device to become the new primary computing device, followed by a full sync of the newly appointed secondary computing devices.

Finally it should be noted that the previous disclosed method steps and features of the computing devices are optimized for the use in an wide-area network environment, meaning that the second computing device is placed at least 50 km apart from the first computing device.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for replicating data comprising:
a first computing device having a first storage unit configured to store block level data, a second storage unit and a volatile memory, the first computing device being configured to:
receive write requests, each of the requests containing payload data, write the payload data of each of the write requests to the volatile memory and append each of the payload data to the second storage unit, and
acknowledge the write requests prior to writing the respective payload data to the second storage unit; and
a second computing device having a third storage unit and a fourth storage unit configured to store block level data, the third storage unit being communicatively coupled to the second storage unit, the second computing device being configured to:
detect new data in the third storage unit, and
apply the new data to the fourth storage unit.

2. The system of claim 1, wherein the first computing device is configured to append each of the payload data to the second storage unit in a different order than the respective payload data was received by the first computing device.

3. The system of claim 1, wherein the first computing device is configured to append each of the payload data to the second storage unit in ascending block number order.

4. The system of claim 1, wherein the second storage unit is a log file stored in a file system provided by the first computing device and wherein the third storage unit is a log file stored in a file system provided by the second computing device.

5. The system of claim 1, wherein the second computing device connects to the first computing devices using a wide area network.

6. A method for replicating data from a first computing device to a second computing device, the method comprising:
receiving a write request with data on the first computing device;
buffering the received data in a volatile memory of the first computing device;
writing the received data to a log file on the first computing device;

acknowledging the write request and then writing the received data to a nonvolatile memory or storage connected to the first computing device and configured to store block level data;

accessing the log file on the second computing device; and writing the data obtained from the log file to a nonvolatile storage connected to the second computing device and configured to store block level data.

7. The method of claim 6, wherein accessing the log file on the second computing device includes copying at least a part of the log file from the first computing device to the second computing device.

8. The method of claim 6, wherein accessing the log file on the second computing device includes accessing the log file from a file system shared between the first computing device and the second computing device.

9. The method of claim 6, wherein the data is a sequence of Bytes having a predetermined length.

10. The method of claim 6, wherein the log file includes an opcode, a timestamp, data and an indication of the length of the data.

11. The method of claim 10, wherein the timestamp is generated according to the Lamport clock algorithm.

12. A first and a second storage device comprising a first and second computing device configured to perform the method of claim 6.

13. A tangible, non-transitory computer readable medium having stored thereon instructions which, when executed by a first processor of a first computing device and a second processor of a second computing device, cause performance the following steps:

receiving a write request with data on the first computing device;

buffering the received data in a volatile memory of the first computing device;

writing the received data to a log file on the first computing device;

acknowledging the write request and then writing the received data to a nonvolatile memory or storage connected to the first computing device and configured to store block level data;

accessing the log file on the second computing device; and writing the data obtained from the log file to a nonvolatile storage connected to the second computing device and configured to store block level data.

* * * * *